Un ited States Patent [19]

de Lavenne et al.

[11] 3,758,911

[45] Sept. 18, 1973

[54] WINDOW WIPER IN PARTICULAR FOR A VEHICLE WINDSCREEN

[75] Inventors: Hubert de Lavenne, Meudon; Andre Leger, Sartrouville, both of France

[73] Assignee: Automobiles Peugeot, Paris, and Regie Nationale Des Usines Renault, Billancourt, both of France

[22] Filed: June 16, 1971

[21] Appl. No.: 153,576

[30] Foreign Application Priority Data

| June 16, 1970 | France | 7022035 |
| Nov. 30, 1970 | France | 7042999 |
| May 13, 1971 | France | 7117379 |

[52] U.S. Cl. .......................................... 15/250.23
[51] Int. Cl. ............................................. B60s 1/34
[58] Field of Search ..................... 15/250.2, 250.21, 15/250.23

[56] References Cited
UNITED STATES PATENTS

| 2,079,399 | 5/1937  | Drew et al.    | 15/250.23 |
| 2,800,676 | 7/1957  | Makela et al.  | 15/250.23 |
| 2,849,742 | 9/1958  | Gores          | 15/250.23 |
| 2,871,501 | 2/1959  | Wernig         | 15/250.23 |
| 3,247,540 | 4/1966  | Howard et al.  | 15/250.23 |
| 3,404,423 | 10/1968 | Howard et al.  | 15/250.23 |

*Primary Examiner*—Peter Feldman
*Attorney*—Burns, Doane, Swecker & Mathis

[57] ABSTRACT

Windscreen wiper of particular utility as a single wiper for a windscreen instead of the usual two wipers. The wiper blade is pivotable about the wiper arm and a link connects a point of the blade offset from the pivot axis of the blade to a journal which is radially offset with respect to the pivot axis of the arm. Consequently, as the wiper arm swings across the windscreen, the wiper blade pivots slightly relative to the arm and wipes a larger area of the windscreen since the blade is practically parallel to the bottom edge of the windscreen at each extreme position.

Arrangements are disclosed for allowing the link to follow the movement of the arm when the latter is swung away from the windscreen for manually cleaning the latter.

4 Claims, 11 Drawing Figures

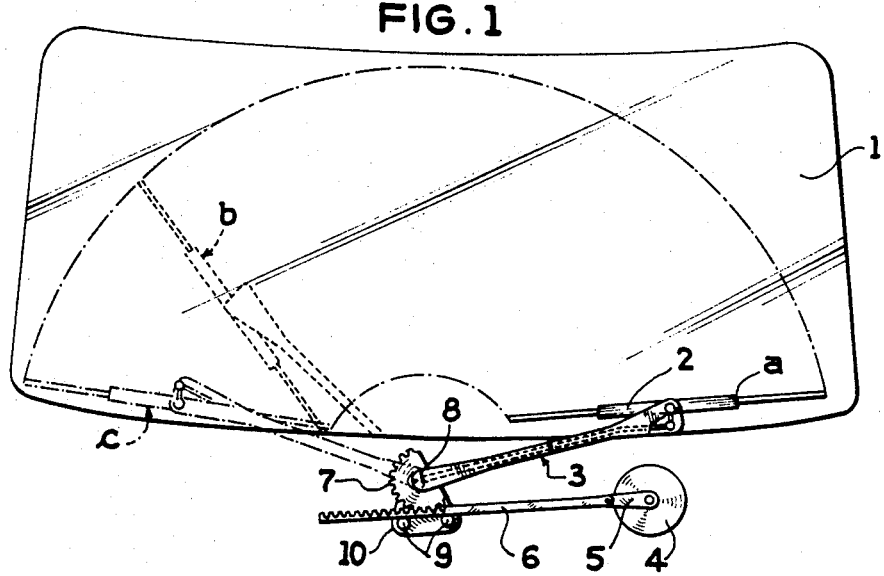
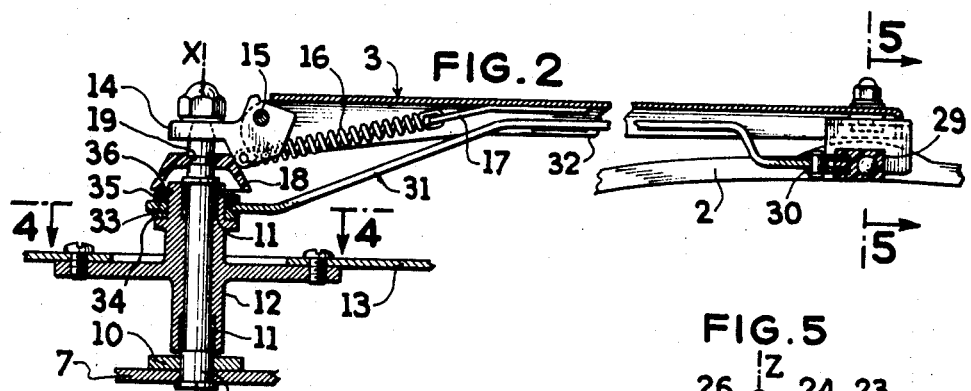
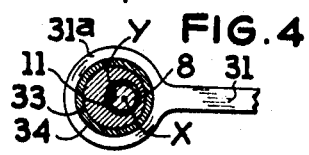
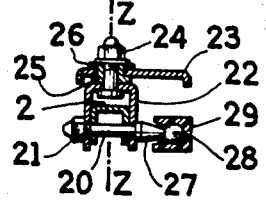
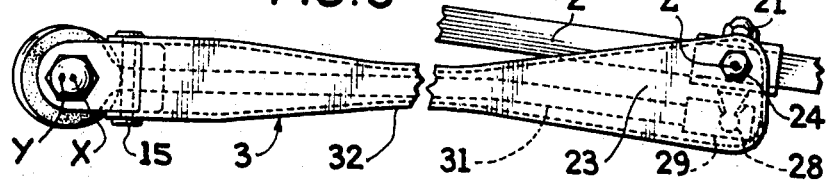

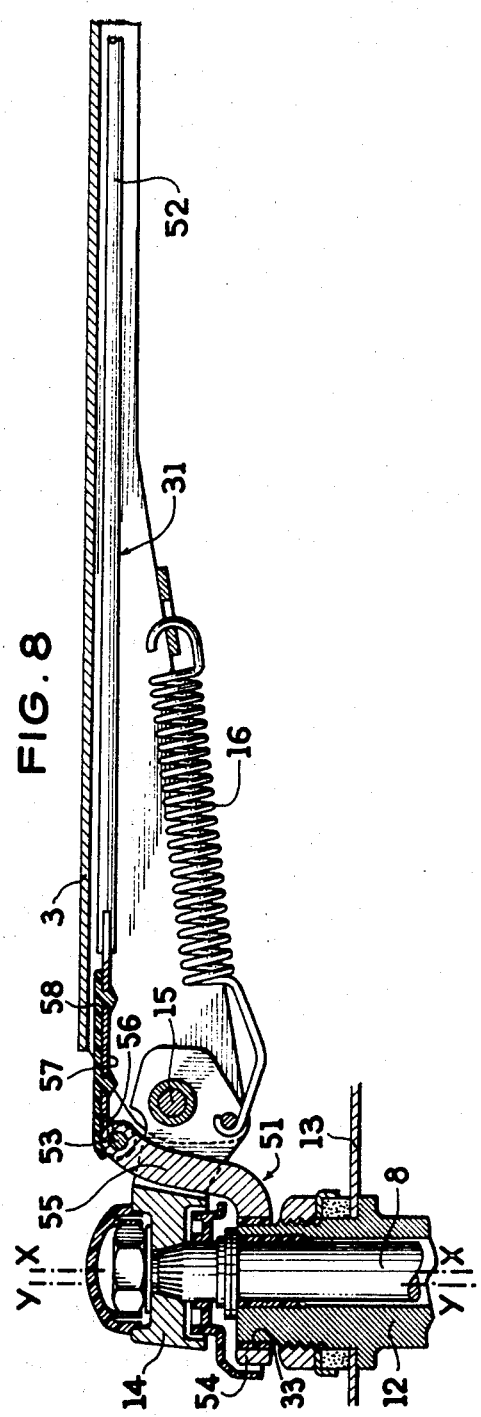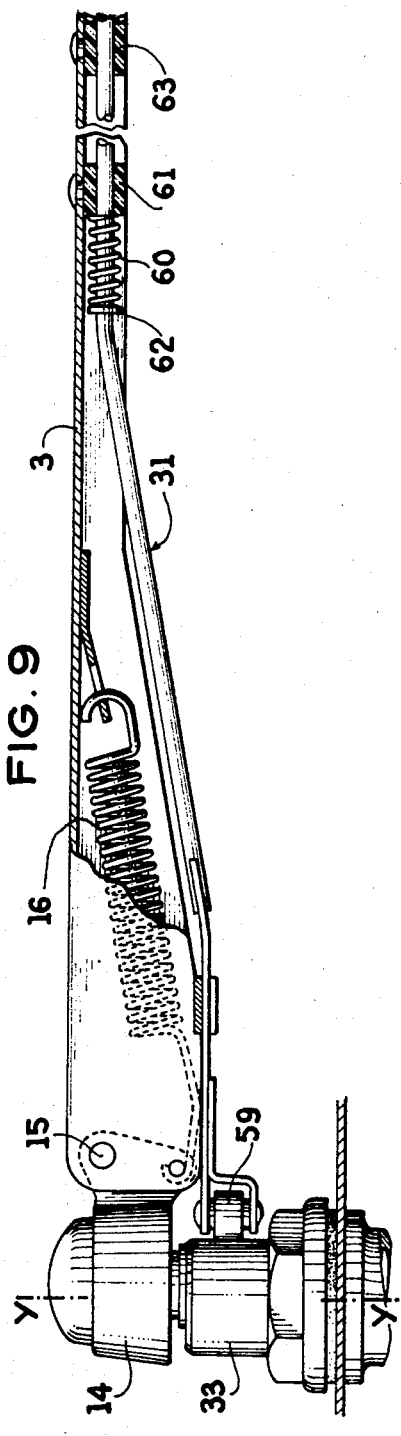

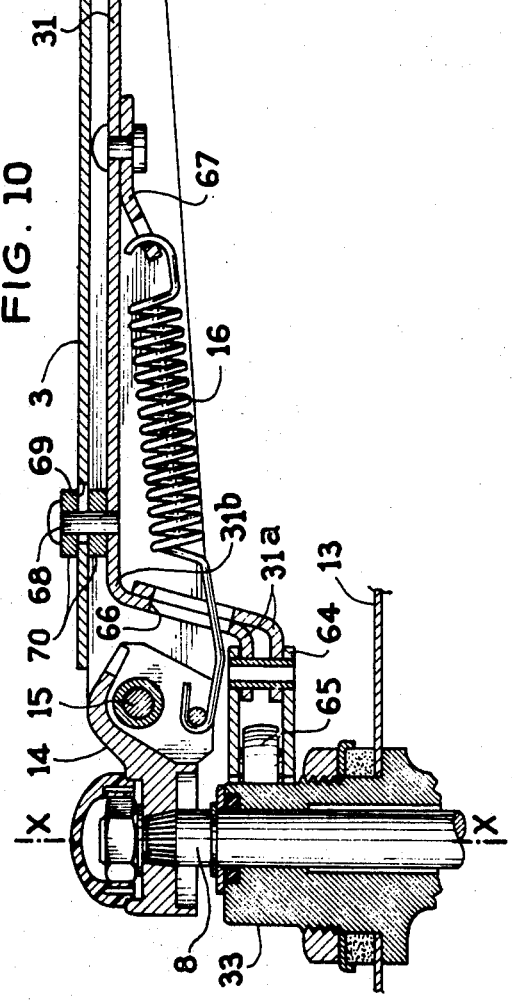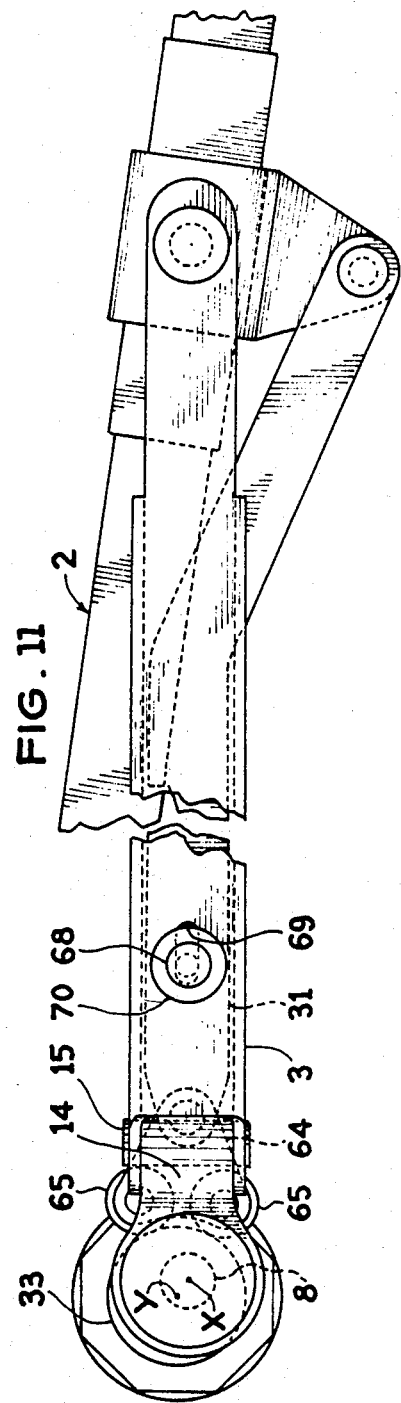

WINDOW WIPER IN PARTICULAR FOR A VEHICLE WINDSCREEN

The present invention relates to a drive mechanism for the blade of a window wiper, in particular a vehicle windscreen wiper.

As known, two blades are usually employed for cleaning a vehicle windscreen, these blades being placed respectively in front of the driver and in front of the passenger. Now, the dimensions of windscreens, and in particular the ratio between their height and width, are such that it is possible to employ only a single blade instead of two. This of course would result in a substantial reduction in the cost price. In this case, the pivot axis of the arm would be placed in the plane of symmetry of the vehicle below the windscreen. Now, bearing in mind that the angle between the blade and the arm is fixed, it is impossible for the blade to arrive as near as possible to the lower edge of the windscreen at each end of its travel or sweep. Consequently, there is such a reduction in the wiped surface that, for obvious reasons of safety, such an arrangement is unfeasible.

An object of the invention is to provide a wiper device which does not have this drawback, is very simple in construction and enables only a single arm and a single blade to be employed for wiping a windscreen.

The invention provides a window wiper device, in particular for a vehicle windscreen, comprising a pivotable arm, a mechanism for driving the arm in an alternating pivotal movement about a fixed first axis, and a blade mounted on the arm, wherein the blade is mounted on the arm to pivot about a second axis substantially perpendicular to the surface to be wiped, and connecting means are provided which are pivoted at a first end of the connecting means to pivot about a fixed third axis in the vicinity of and separate from the first axis and at a second end of the connecting means to the blade at a point in the vicinity of and separate from the second axis.

With this arrangement, when the arm pivots, the angular position of the blade relative to the arm is automatically modified whereby the blade is located at each end of its travel in the immediate vicinity of the lower edge of the windscreen and thus wipes a very large area of the windscreen.

According to another feature there is provided, at the end of the connecting means which is in the vicinity of the pivot axis of the arm, means whereby the connecting means can freely follow the wiper arm when the arm is swung with respect to its support and thus moved away from the surface to be wiped.

According to one embodiment of the invention, the connecting means comprise a link constructed of two parts, namely a first part which is rotatably mounted on an eccentric journal of a fixed bearing in which the drive shaft of the arm is rotatably mounted and a second part which is pivoted to the first part to pivot about an axis parallel to the pivot axis of the arm.

According to another embodiment of the invention, the end of the link engages the eccentric journal of the bearing through a bearing face which subtends at the axis of the journal an angle which is less than or in the neighbourhood of 180°. Preferably, this face is constituted by the periphery of a roller carried by the adjacent end of the link, guide means being in this case provided on the arm of the wiper for driving the link at the same time as the arm in the course of the alternating pivotal movement and when raising the arm away from the surface to be wiped.

Further features and advantages of the invention will be apparent from the ensuing description with reference to the accompanying drawings.

In the drawings:

FIG. 1 is a diagrammatic front elevational assembly view of a windscreen and a window wiper device according to the invention;

FIG. 2 is a longitudinal sectional view of the device on an enlarged scale;

FIG. 3 is a plan view of the wiper;

FIG. 4 is a sectional view taken along line 4—4 of FIG. 2;

FIG. 5 is a sectional view taken along line 5—5 of FIG. 2;

FIGS. 8 and 9 are respectively a longitudinal sectional view and a partial sectional view of the part of the assembly showing how the wiper is mounted on its support according to two modifications, and FIGS. 10 and 11 are a longitudinal sectional view and a partial plan view respectively of another modification.

FIG. 1 shows a windscreen 1 of a vehicle which is wiped by means of a wiper device having a single blade disposed roughly in the plane of symmetry of the vehicle.

Figure 6:
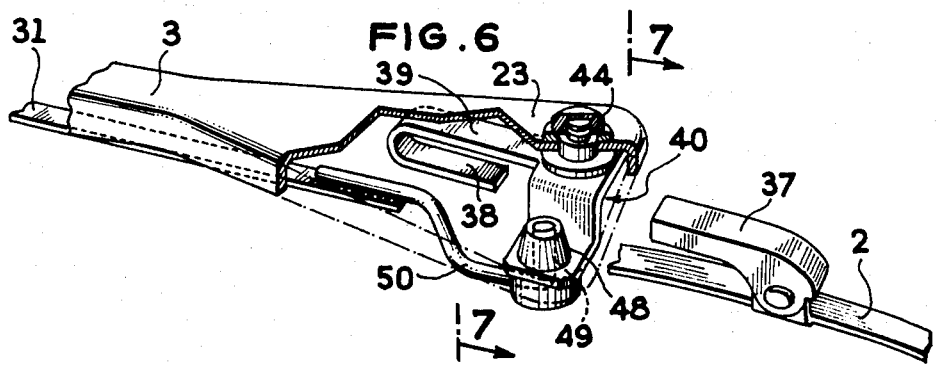
FIG. 6 is a perspective view of a modification.

This wiper mainly comprises a blade 2 which is driven in an alternating pivotal movement by an arm 3. This alternating movement can be produced by any suitable known means. One of these means, shown by way of example, comprises an electric motor 4, a crank 5, a rack 6 and a toothed sector 7 integral with a drive shaft 8 which has an axis of rotation X—X. The rack 6 is retained in engagement with the sector 7 by rollers 9 which are freely rotatable on a fork 10 pivotably mounted on the shaft 8. The drive shaft 8 is supported by two bushes 11 disposed in a bearing 12 secured to a fixed part 13 of the body of the vehicle. Locked to the outer end portion of the shaft 8 is a support 14 to which is pivoted by a pivot pin 15 the drive arm 3 of the blade 2. A spring hooked at one end to the support 14 and its other end to a tab 17 welded to the arm 3, biases the blade 2 against the windscreen 1 at a given pressure as the blade follows the curved surface of the windscreen. A cup 18 of rubber or like material is engaged in a groove 19 in the shaft 8 and is adapted to prevent the introduction of foreign bodies between the shaft and the bushes 11.

The blade 2 is of conventional type and is secured by a screw 20 and nut 21 to fork 22 which is secured at a widened end portion 23 of the arm 3 by a screw 24 (FIG. 5). Washers 25 and 26 of plastics material are interposed between the screw 24 and the arm 3, the washer 25 constituting a bearing so that the blade is pivotable with respect to the arm about the axis Z—Z of the screw 24. The head of the screw 20 is extended by a finger portion 27 which terminates in a spherical journal head 28 which is resiliently engageable in a fork 29 of plastics material. The fork 29 carries two embedded elements 30 which are connected, for example by riveting, to a link 31 in the form of a flexible metal strip and disposed between stiffening flanges 32 of the arm 3 behind which the link is hidden. The widened end portion 23 of the arm is also provided for hiding the fork 29 and the finger portion 27. The other end of the link 31 terminates in an eye 31$^a$ which is engaged on a journal 33 having an axis Y—Y which is eccentric or offset with respect to the axis X—X of the drive shaft 8. The link 31 is freely pivotable about a shouldered washer 34 of plastics material and it is retained by a second washer 35 of plastics material and a retaining ring 36.

Operation of this wiper device will be explained with reference to the assembly view of FIG. 1. First, this assembly view shows that if the angle between the blade 2 and the arm 3 remains constant, and if the blade 2 starts from an end-of-travel position *a* which is as near as possible to the lower edge of the windscreen 1, it is impossible for the blade to pivot past at the opposite end of travel position *b*, shown in dotted line, in which the lower end of the blade abuts the lower edge of the windscreen.

In the mechanism according to the invention, the presence of the link 31 which pivots about an axis Y—Y which is radially offset with respect to the pivot axis X—X of the arm 3, has for effect to turn the blade 2 about its pivot axis Z—Z corresponding to screw 24 which pivots it to the arm 3, so that it can occupy the illustrated extreme position *c* (FIG. 1) and thus considerably increase the total wiped area. In the course of the to-and-fro movements, the flexibility of the link 31 in no way hinders movements of the arm 3 about its pivot pin 15 caused by the curvature of the windscreen.

When the wiper is desired to be completely swung away from the windscreen, the spherical journal head 28 is first disengaged from the fork 29 and the wiper is then raised or swung in the same way as a conventional wiper.

It will be observed that the link 31 and its pivotal connections at each end are completely hidden by the arm of the wiper so that the assembly is perfectly aesthetic. Moreover, the widened end portion 23 of the arm 3 results in an increased force of application of the blade 2 against the windscreen and thus increases the wiping efficiency.

Another important advantage of the device according to the invention is that it can be easily constructed from a conventional wiper so that the cost price may be relatively low, above all bearing in mind the essential fact that a single blade is employed instead of two.

Figure 7:
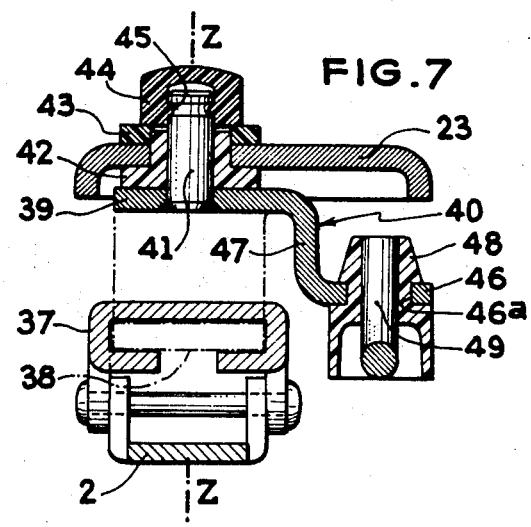
FIG. 7 is a sectional view taken along line 7—7 of FIG. 6.

FIGS. 6 and 7 show a modification of the connection between the blade on one hand and the arm and link on the other.

In this modification, the blade 2 comprises an assembly member 37 of known type whereby it is possible to mount the blade by simply fitting it in the curved end portion 38 of one of the branches 39 of a member 40. The latter carries a stud 41 which constitutes the pivot of the pivotal connection to the arm 3. Washers of plastics material 42 and 43 are interposed between the stud 41 and the arm 3, the washer 42 constituting a bearing. The assembly is retained by a cap 44 of plastics material which is resiliently retained or clipped on the end 45 of the stud 41.

Another branch 46 of the member 40 is connected to the branch 39 by a cranked portion 47 and has an aperture 46$^a$ receiving a bushing 48 of plastics material in which is engaged the cranked end portion 49 of a rod 50 welded to the link 31.

Apart from the fact that in this case the blade 2 is separated from the link by merely disengaging the rod 49 from the bushing 48, the operation of this wiper device is identical to that of the preceding embodiment.

In the various foregoing embodiments of the wiper device it is necessary to provide a detachable connection between the blade of the wiper and the adjacent end of the connecting means or link so as to be in a position to detach these two elements before swinging the arm and blade completely away from the windscreen. Now, it could happen that, due to ignorance of this constructional feature, the arm assembly be suddenly swung away from the windscreen without first disengaging the link from the blade. This might damage the link or its pivot connection to the blade. This drawback is avoided in the embodiments shown in FIGS. 8–11.

FIG. 8 shows the support 14 integral with the drive shaft 8 which constitutes a fork to which the wiper arm 3 is pivoted by a pivot pin 15. An end of the spring 16 which biases the blade 2 against the surface to be wiped is also hooked to the fork 14. Moreover, the relative positions of the pin 15 of the arm 3 and the hooking point of the spring 16 are such that there is a deadcentre position which it is sufficient to pass through for the wiper arm to be maintained in a given position spaced away from the surface to be wiped.

According to the invention, the link 31, which is connected at its right end (as viewed in FIG. 8) to the wiper blade 2 in such manner as to modify the angular position of the blade with respect to the arm 3, is constructed in two parts 51, 52 which are pivoted to each other by a pin 53 parallel to the pin 14 connecting the arm 3 to the support 14. The first part 51 of the link comprises an eye 54 rotatably mounted on the fixed journal 33 which is eccentric or radially offset with respect to the drive shaft 8, this eye including an extension 55 which extends between the support 14 and the arm 3 and is connected at its upper end portion to the second part 52 of the link. In the specific illustrated embodiment, the pin 53 extends beyond each side of the extension 55 and two end portions 56 of a plate 57 are rolled round this pin and the second part 52 of the link 31 is welded to the plate 57. A cover 58, which may be constructed of a flexible synthetic material, is secured to the plate 57 for example by resilient interclipping means.

This assembly operates in a very simple manner. When the wiper motor (not shown) is started up, the drive shaft 8 is pivoted in alternating directions about axis X—X and this brings about a corresponding movement of the support 14 and wiper arm 3. Simultaneously, the link 31 participates in this pivoting movement and is also displaced longitudinally of the arm 3 due to the offset of the axes X—X and Y—Y. When stationary, if it is desired to swing the wiper assembly away from the windscreen to clean the latter manually, it suffices to swing arm 3 about the pin 15 and this pivots the link 31 about the pin 53. The offset between the two pins results in a relative displacement between the link and the arm similar to that which occurs in operation under the action of the journal 33. In view of the fact that at the moment when the wiper arm is swung away from the windscreen the wiper is in the position of rest, that is, in the position shown in the drawing, this relative displacement of the link and arm is not added to the displacement due to the offset of the journal 33 and is consequently allowable.

In the embodiment shown in FIG. 9, the arm 3 is pivoted to its support 14 by a pin 15 which is disposed slightly higher than in FIG. 8, the end of the spring 16 being itself disposed further inside the fork constituted by the wiper arm.

The link 31 merely carries at its left end (as viewed in FIG. 9) a roller 59 which is in contact with the journal 33. A spring 60, engaged between an element 61 integral with the arm 3 and another element 62 integral with the link, biases the roller 59 against the journal 33. Further, the link 31 is guided with respect to the arm 3, for example by elements such as 63.

It will be understood that the result is similar to that described hereinbefore, that is to say, when the wiper arm 3 is swung about its pivot pin 15, the link 31 is moved therewith and the roller 59 is merely shifted away from the journal 33. This roller could moreover be replaced by a support face which subtends at the axis Y—Y an angle less, or even slightly greater than 180°, this face slidably engaging the journal 33.

In the embodiment shown in FIGS. 10 and 11, the end of the link 31 adjacent the drive shaft 8 is pivoted to a fork 64 carrying two rollers 65 which engage the eccentric journal 33. This is a more balanced arrangement than in the case of a single roller.

The link 31 is cranked at 31$^a$, 31$^b$ and has in its intermediate part an aperture 66 through which extends the spring 16 which biases the blade against the windscreen. This spring is hooked at one end to the support 14 of the arm 3 and at its other end to a tab 67 secured under the link 31. The link 31 is connected to the arm 3 by at least one rivet 68 which is movable in an aperture 69 in the arm 3. Washers 70 composed of a self-lubricating material ensure a smooth sliding motion between the link 31 and arm 3. When it is desired to swing the arm away from the windscreen, the rivet 68 encounters the end of the aperture 69 adjacent the drive shaft and the unit comprising the arm 3 and link 31 swings about the pin 15 and the rollers 65 merely move away from the journal 33.

In this arrangement, the spring 16 also applies the rollers 65 of the link 31 against the journal 33 and there is no need to provide a second spring for this purpose. Further, the guide means are simplified and the whole of the device is stronger, its performance improved and its life prolonged.

The embodiments shown in FIGS. 8–11 afford the advantage of enabling the arm, the blade and the link to be swung together away from the windscreen with no need to provide a detachable connection between the link and the blade. Moreover, it will be observed that the means employed for achieving this result are very simple and not of a type which substantially complicates the device or markedly increases the cost price.

It must be understood that any of the described embodiments may be employed for wiping a quarter-light of a vehicle or any other surface other than a windscreen of a vehicle.

Having now described our invention what we claim and desire to secure by Letters Patent is:

1. A window wiper device, in particular for a vehicle windscreen, comprising a support, bearing means carried by the support, a drive shaft mounted in the bearing means to rotate about a fixed first axis, an arm, a support member integral with the shaft, pivot means connecting the arm to the support member and allowing the arm to be swung relative to the support member substantially in a plane containing said first axis, drive means drivingly connected to the shaft for pivoting the shaft and arm in an alternating pivotal movement about said first axis, wiper blade means, first pivot means connecting the blade means to the arm to pivot relative to the arm about a second axis which is arranged to be substantially perpendicular to the window to be wiped, a journal integral with the support and having a third axis in the vicinity of and radially offset relative to said first axis, means defining a link having a first end portion and a second end portion, second pivot means pivotably connecting the second end portion of the link to the blade means so that the link is pivotable relative to the blade means about a fourth axis in the vicinity of and spaced from said second axis, means mounting the link on the arm so that the link is slidable relative to the arm, an element pivoted to said first end portion of the link, two rollers carried by the element and engaging the journal to revolve about said third axis, and a spring having one end connected to the support member and an opposed end connected to the link and adapted and arranged to bias the arm toward the window to be wiped and bias the two rollers against the journal.

2. A device as claimed in claim 1, wherein the link has a cranked portion and means defining an aperture in the cranked portion through which the spring extends.

3. A device as claimed in claim 1, wherein the means mounting the link on the arm comprise means defining at least one elongated aperture and a stud co-operating with the aperture provided respectively on one and on the other of two elements consisting of the link and arm.

4. A device as claimed in claim 3, wherein said stud is a rivet having a head and carried by the link and two washers composed of self-lubricating material are disposed on the rivet and respectively between the arm and the link and between the arm and the head of the rivet so as to facilitate relative movements between the link and the arm.

* * * * *